United States Patent [19]

Horst

[11] Patent Number: 5,404,550
[45] Date of Patent: Apr. 4, 1995

[54] METHOD AND APPARATUS FOR EXECUTING TASKS BY FOLLOWING A LINKED LIST OF MEMORY PACKETS

[75] Inventor: Robert W. Horst, Champaign, Ill.

[73] Assignee: Tandem Computers Incorporated, Cupertino, Calif.

[21] Appl. No.: 735,594

[22] Filed: Jul. 25, 1991

[51] Int. Cl.$^6$ ............................................. G06F 3/00
[52] U.S. Cl. .................. 395/800; 364/232.22.232.91; 364/DIG. 1
[58] Field of Search ............... 395/800, 400, 275, 325, 395/650, 375; 364/200, DIG. 1, DIG. 2, 232.22, 232.91

[56] References Cited

U.S. PATENT DOCUMENTS

| | | | |
|---|---|---|---|
| 3,962,706 | 6/1976 | Dennis et al. | 395/650 |
| 4,149,240 | 4/1979 | Misunas et al. | 395/800 |
| 4,153,932 | 5/1979 | Dennis et al. | 395/800 |
| 4,837,676 | 6/1989 | Rosman | 395/325 |
| 4,893,234 | 1/1990 | Davidson et al. | 395/800 |
| 4,972,315 | 11/1990 | Yamasaki et al. | 395/400 |
| 5,021,947 | 6/1991 | Campell et al. | 395/700 |
| 5,043,880 | 8/1991 | Yoshida | 395/375 |
| 5,093,919 | 3/1992 | Yoshida et al. | 395/800 |
| 5,117,489 | 5/1992 | Komori et al. | 395/375 |
| 5,179,685 | 1/1993 | Nojiri | 395/425 |

OTHER PUBLICATIONS

Jain et al. "WSI Architecture for L-U Decomposition: A Radar Array Processor", IEEE Feb. 1990, pp. 102–108.
Ramaswamy "A Methodology for Wafer Scale Integration of Linear Pipelined", IEEE Feb. 1990, pp. 220–228.
Robert Whiting Horst, "Task Flow: A Novel Approach to Fine-Grain, Wafer-Scale Parallel Computing", Thesis Submitted to University of Illinois at Urbana-Champaign, Apr. 1991.
Robert W. Horst, "A Linear-Array WSI Architecture for Improved Yield and Performance", proc. Int'l Conf. on Wafer Scale Int. Jan., 1990.
Srini, Vason P., "An Architectural Comparison of Dataflow Systems", IEEE, Mar. 1986, pp. 68–88.
Arvind and Culler, David E., "Dataflow Architectures", Ann. Rev. Comput. Sci., 1986, 1:225–53.
Nikhil, R. S. and Arvind, "Can dataflow subsume von Neumann Computing?", MIT Lab. for Comp. Science, 1989, pp. 262–272.
Papadopoulos & Culler, "Monsoon: an Explicit Token-Store Architecture", IEEE, 1990, pp. 82–91.
Borker, Shekhar, et al., "Supporting Systolic and Memory Communication in iWarp", 17th Int'l Symp. on Computer Architecture, May 1990, pp. 1–40.

Primary Examiner—Alyssa H. Bowler
Assistant Examiner—D. Nguyen
Attorney, Agent, or Firm—Townsend and Townsend Khourie and Crew

[57] ABSTRACT

A computer architecture has a plurality of processing cells interconnected to perform programming tasks. Each cell contains both memory and processing elements. Memory packets contain an instruction, a data element, and a pointer to another memory packet. Tasks are executed by following a linked list of memory packets. Transmission packets communicate instructions and register values along the linked list. A plurality of computer processes may be executed simultaneously.

35 Claims, 13 Drawing Sheets

| NOP | | No Operation. Goto next link | | | |
|---|---|---|---|---|---|
| Sender actions: | | | | | |
| Receiver actions: Create SND packet | | | | | |
| -Packet- | -Instr- | -Ra- | -Rb- | -Cell- | -Adr- |
| SND | MEM.inst | RCV.Ra | RCV.Rb | | MEM.link |

| LOAD | Ra | Load Ra from memory | | | |
|---|---|---|---|---|---|
| Sender actions: | | | | | |
| Receiver actions: Create SND packet | | | | | |
| -Packet- | -Instr- | -Ra- | -Rb- | -Cell- | -Adr- |
| SND | MEM.instr | MEM.data | RCV.Rb | | MEM.link |

| Add | Ra | Ra = Ra + memory | | | |
|---|---|---|---|---|---|
| Sender actions: | | | | | |
| Receiver actions: SUM = RCV.Ra + MEM.data; Create SND packet | | | | | |
| -Packet- | -Instr- | -Ra- | -Rb- | -Cell- | -Adr- |
| SND | MEM.instr | SUM | RCV.Rb | | MEM.link |

| Add | Rb | Ra = Rb + memory | | | |
|---|---|---|---|---|---|
| Sender actions: | | | | | |
| Receiver actions: SUM = RCV.Rb + MEM.data; Create SND packet | | | | | |
| -Packet- | -Instr- | -Ra- | -Rb- | -Cell- | -Adr- |
| SND | MEM.instr | SUM | RCV.Rb | | MEM.link |

| FORK | | Fork a new task | | | |
|---|---|---|---|---|---|
| Sender actions: Create SEQ packet | | | | | |
| Receiver actions: Create SND packet | | | | | |
| -Packet- | -Instr- | -Ra- | -Rb- | -Cell- | -Adr- |
| SND | MEM.instr | RCV.Ra | RCV.Rb | | MEM.link |
| SEQ | NOP | RCV.Ra | RCV.Rb | LocCell | LocAdr+1 |

| STF | Ra | Store Ra to memory via Forked task | | | |
|---|---|---|---|---|---|
| Sender actions: Create SEQ packet | | | | | |
| Receiver actions: MEM.data = RCV.Ra | | | | | |
| -Packet- | -Instr- | -Ra- | -Rb- | -Cell- | -Adr- |
| SEQ | NOP | RCV.Ra | RCV.Rb | LocCell | LocAdr+1 |

| GET | Rb | Send task to get data and return to next | | | |
|---|---|---|---|---|---|
| Sender actions: Override SND.Rb with LocCell, LocAdr+1 | | | | | |
| Receiver actions: Create SND packet | | | | | |
| -Packet- | -Instr- | -Ra- | -Rb- | -Cell- | -Adr- |
| SND | NOP | RCV.Ra | MEM.data | | RCV.Rb |

| BZERO | Ra | Branch if Ra == 0, else sequential | | | |
|---|---|---|---|---|---|
| Sender actions: | | | | | |
| Receiver actions: If(RCV.Ra==0) create SND else create SEQ | | | | | |
| -Packet- | -Instr- | -Ra- | -Rb- | -Cell- | -Adr- |
| SND | MEM.instr | RCV.Ra | RCV.Rb | | MEM.link |
| SEQ | NOP | RCV.Ra | RCV.Rb | LocCell | LocAdr+1 |

| LLOAD | Rb | Locked Load Rb from memory | | | |
|---|---|---|---|---|---|
| Sender actions: | | | | | |
| Receiver actions: Retry if MEM.lock=1; Create SND; MEM.loc=0 | | | | | |
| -Packet- | -Instr- | -Ra- | -Rb- | -Cell- | -Adr- |
| SND | MEM.Instr | RCV.Ra | MEM.data | | MEM.link |

| LSTF | Ra | Locked Store Rb to memory via Forked task | | | |
|---|---|---|---|---|---|
| Sender actions: Create SEQ packet | | | | | |
| Receiver actions: Retry if MEM.lock=0; MEM.data, lock=RCV.Ra,1 | | | | | |
| -Packet- | -Instr- | -Ra- | -Rb- | -Cell- | -Adr- |
| SEQ | NOP | RCV.Ra | RCV.Rb | LocCell | LocAdr+1 |

FIG. 8.

$$\begin{bmatrix} U'_0 \\ U'_1 \\ U'_2 \end{bmatrix} = \begin{bmatrix} 0 & W_{01} & W_{02} \\ W_{10} & 0 & W_{12} \\ W_{20} & W_{21} & W_{22} \end{bmatrix} \cdot \begin{bmatrix} U_0 \\ U_1 \\ U_2 \end{bmatrix}$$

*FIG. 10.*

METHOD AND APPARATUS FOR EXECUTING TASKS BY FOLLOWING A LINKED LIST OF MEMORY PACKETS

BACKGROUND OF THE INVENTION

This invention is in the field of computer architecture, and, more particularly it relates to parallel processing and multiprocessor computer systems.

Current approaches to parallel processing include Single Instruction Multiple Data (SIMD) machines, parallel processors, systolic arrays, and data flow machines. SIMD machines use a single sequential instruction stream to control parallel arithmetic units. Multiple Instruction Multiple Data (MIMD) computer have a large number of sequential processors which are connected to memory elements through a routing network. Systolic arrays such as WARP and iWARP pass data through a communications network in such a way that operands simultaneously arrive at a processing element. Data flow machines pass data tokens to processing elements which "fire" after all operands arrive.

In addition to the many possible architectures for parallel processing machines using known discrete microprocessors, developments in Integrated Circuit (IC) fabrication have created new possibilities for multiprocessor computer systems. The ever increasing density of Very Large Scale Integration (VLSI) components offers new challenges to computer architects to find optimal use for the added silicon area. Today it is feasible to include a processor, floating point arithmetic unit, and small, first-level cache on a single IC. Higher levels of integration have greatly improved single processor performance, largely due to the elimination of inter-circuit signal delays in the critical paths to the memory caches.

As circuit densities continue to increase, the next steps needed to improve performance are not clear. Increasing the size of the on-chip caches will improve performance but this "solution" soon reaches a point of diminishing returns. Another approach is to include multiple function units and to allow multiple instructions to be dispatched simultaneously. These "superscalar" designs also improve performance, but the techniques used do not scale beyond a few instruction dispatches per cycle.

The advances of Wafer Scale Integration (WSI) will add even more pressure to find creative uses for the vast increases in available circuit area. It is likely that the next major advance in processing speed will result from the incorporation of multiple parallel processors on the same silicon device. Many current approaches to parallel processing define the problem in terms of selecting an optimal interconnection network for multiple high-performance microprocessors.

Although much work has been done on parallel processors and their interconnection networks, the problems with known approaches include the complexity of the interconnection network and the necessity of frequent and time-consuming memory access. A parallel processing architecture which could utilize a relatively simple interconnection network and reduce the number of needed main memory accesses would be a significant advance in parallel computing.

SUMMARY OF THE INVENTION

The present invention comprises a new computer architecture which uses a plurality of processing units operating in parallel. This architecture is known herein as task flow architecture. Simple replicated cells contain both memory packets and processing logic. Each memory packet contains a data field, the next instruction and a link. Execution of a task is accomplished by following a linked list of memory packets. Register values and instructions are communicated as part of a transmission packet to the next memory packet in the linked list.

This invention involves sending computations to stationary data objects, rather than sending data from memory to stationary processors. There are multiple cells which contain both computing and memory elements. Data is partitioned across the simple identical interconnected cells. Computation is performed by a set of tasks flowing through the network. Each task is executed by following a linked-list of memory packets, each of which contains a data element, the next instruction to perform, and a link to the next memory packet.

This task flow architecture will now be described in detail with reference to the figures listed and described below.

BRIEF DESCRIPTION OF THE ILLUSTRATIONS

FIG. 8 is a description of several instructions used in the present invention;

Figure 9:
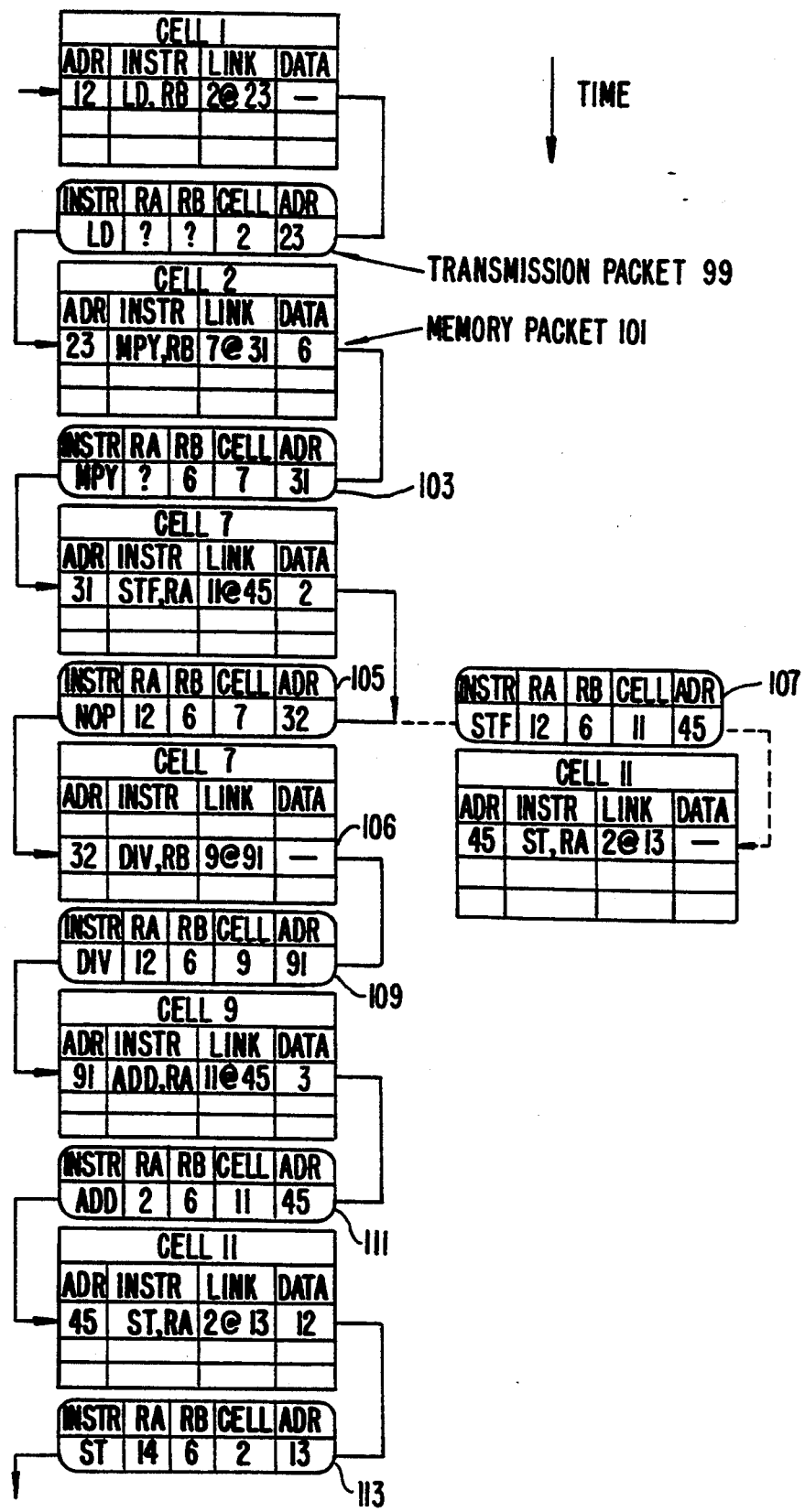
Figure 11:
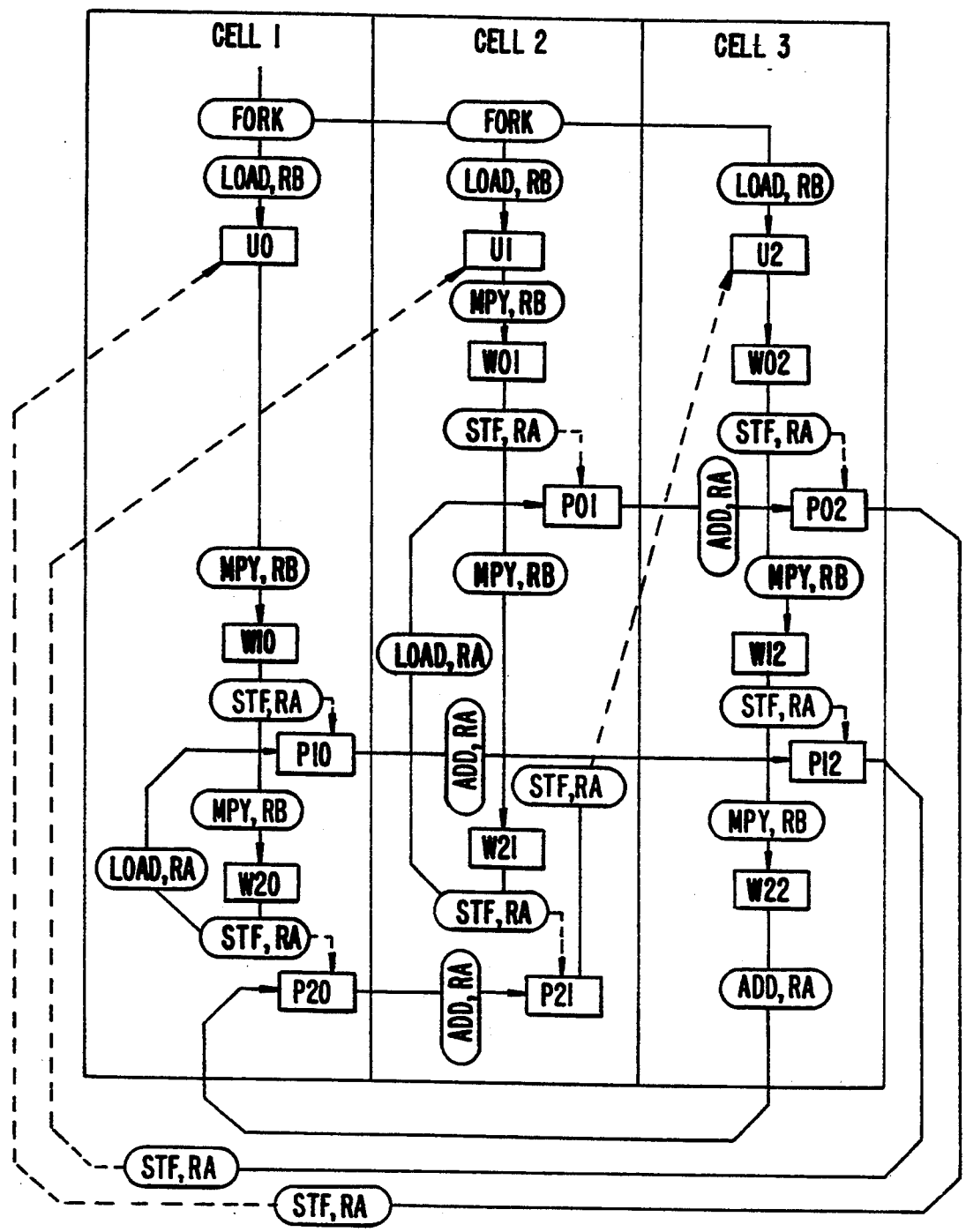
Figure 13:
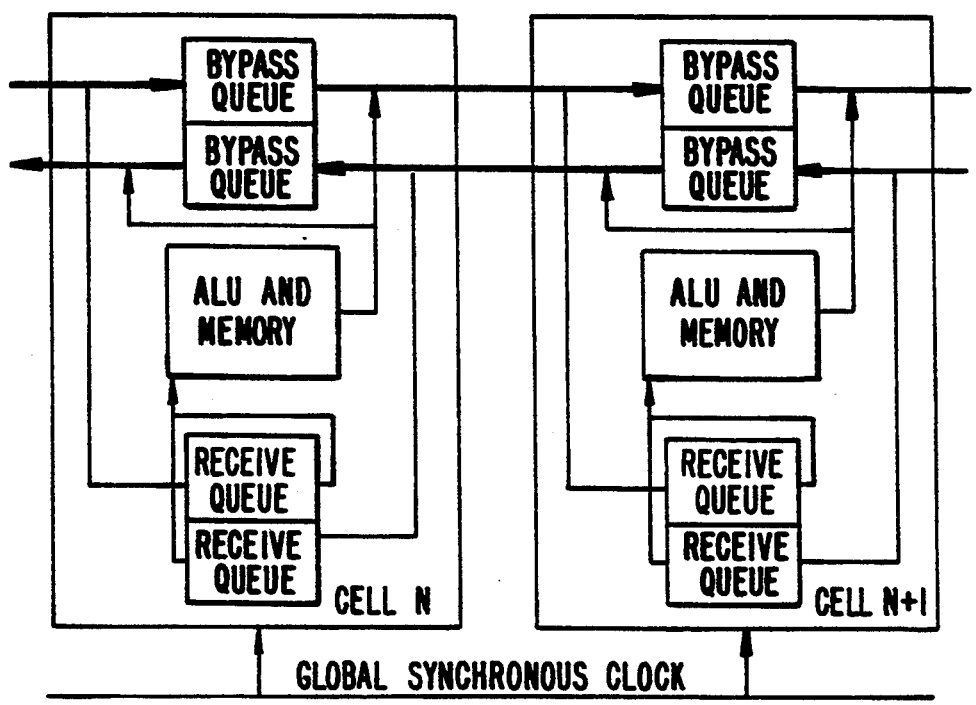
Figure 14:
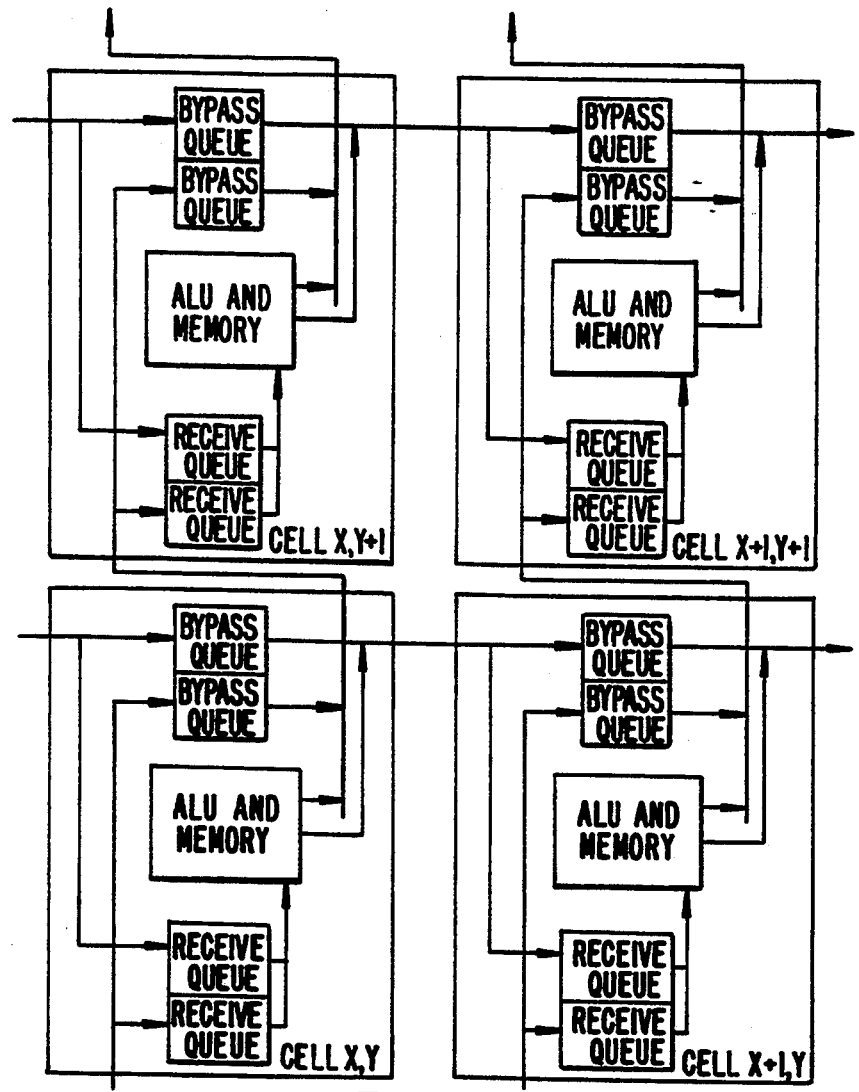
Figure 15:
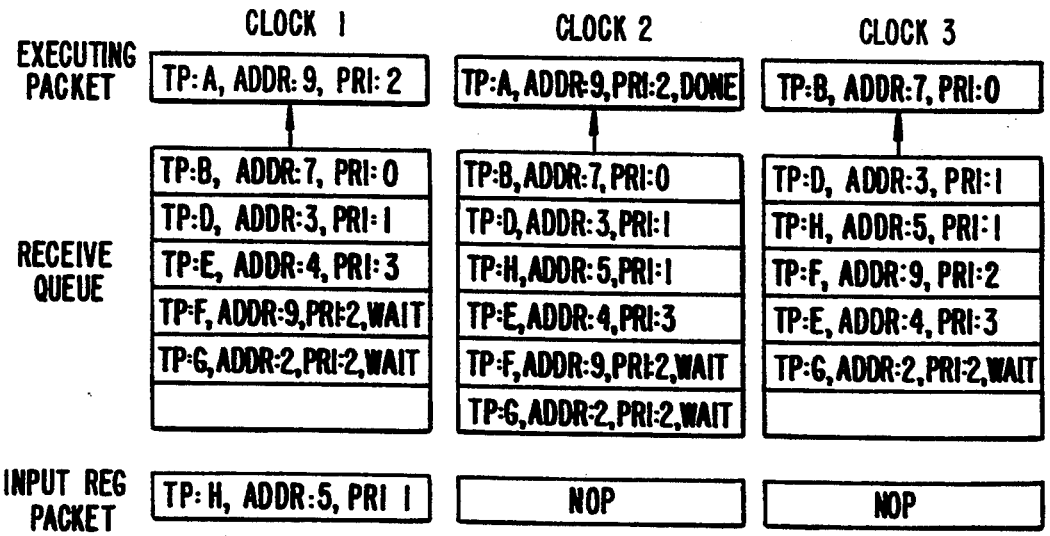
Figure 16:
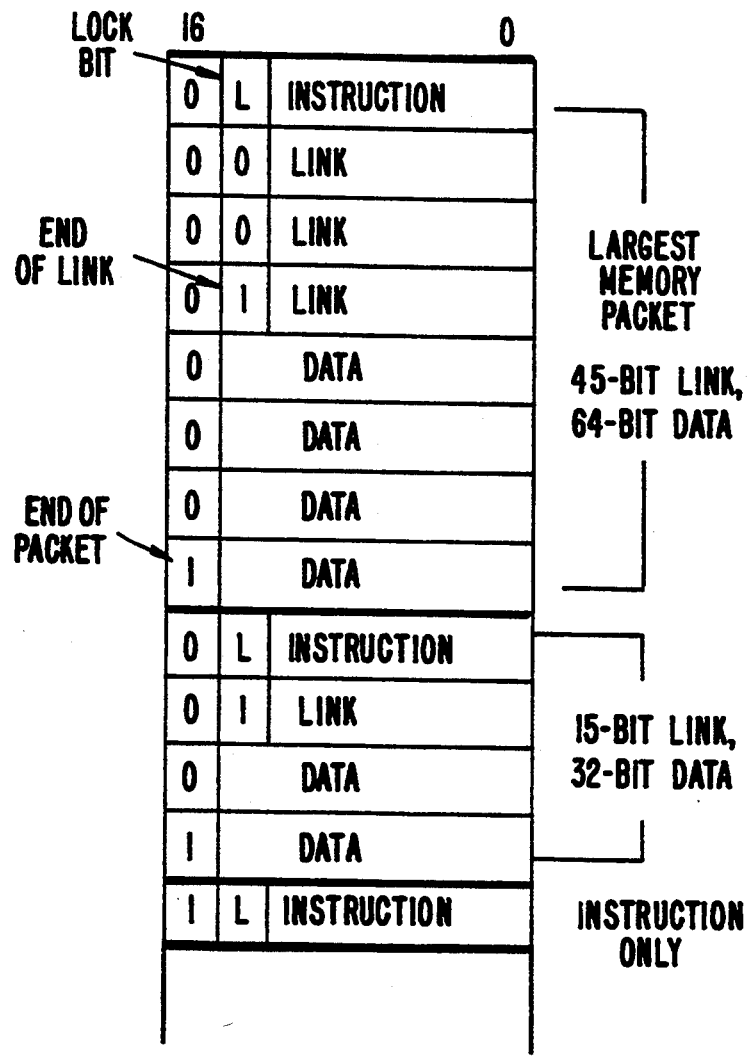

FIG. 9 an example of task flow execution;

FIG. 10 is an example of matrix-vector multiplication using the present invention; and FIG. 11 is another example of task flow execution;

FIG. 11 shows a diagram of two cells in a two-bus-per-cell bidirectional ring;

FIG. 13 shows a bidirectional ring implemented with four bus connections to each cell;

FIG. 14 shows four cells of a unidirectional torus;

FIG. 15 shows the receive queue at three sequential time steps;

FIG. 16 shows a possible encoding of variable length MPs; and

Figure 17:
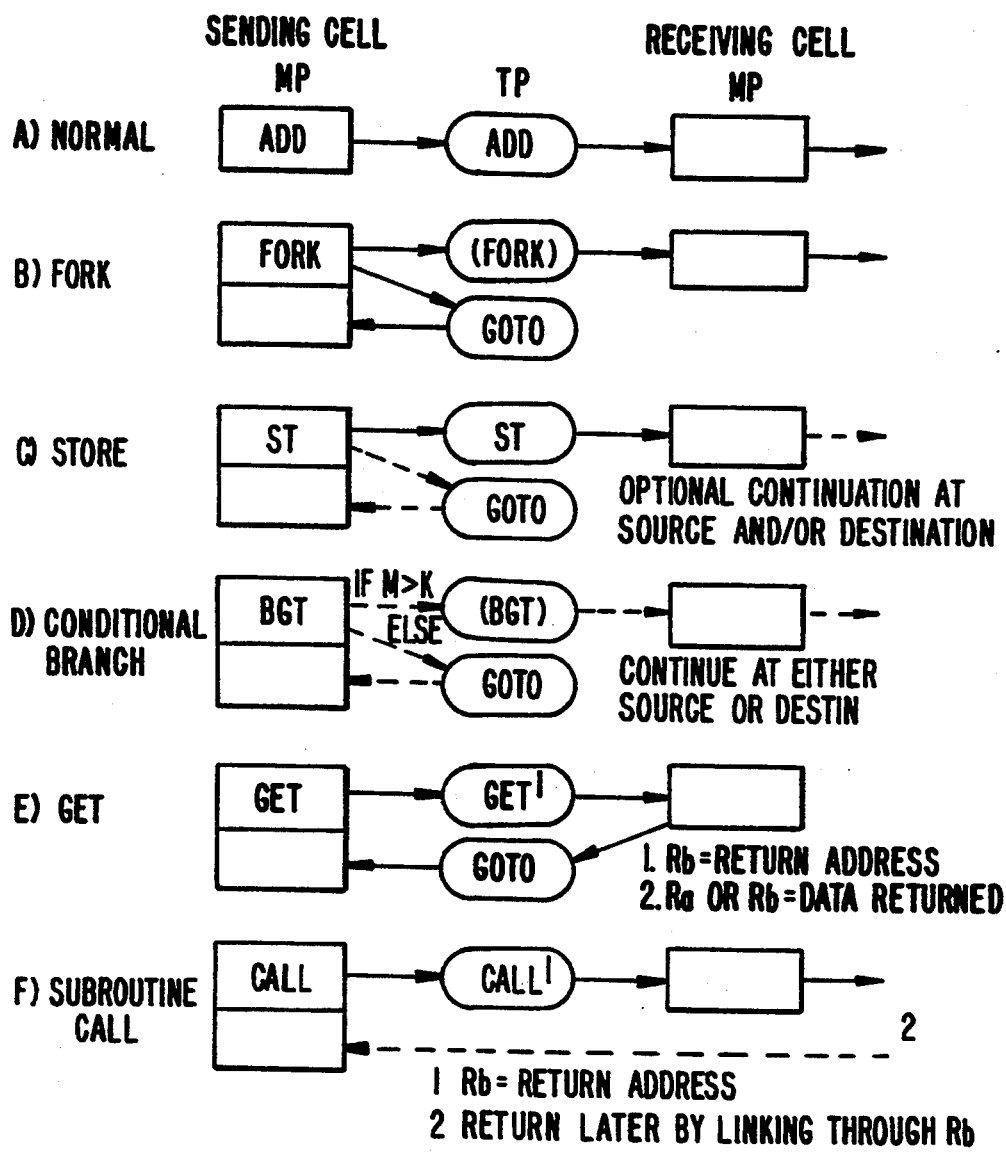

FIG. 17 illustrates the six classes of instructions in the first preferred embodiment of the present invention.

DETAILED DESCRIPTION OF THE EMBODIMENT

Figure 1:
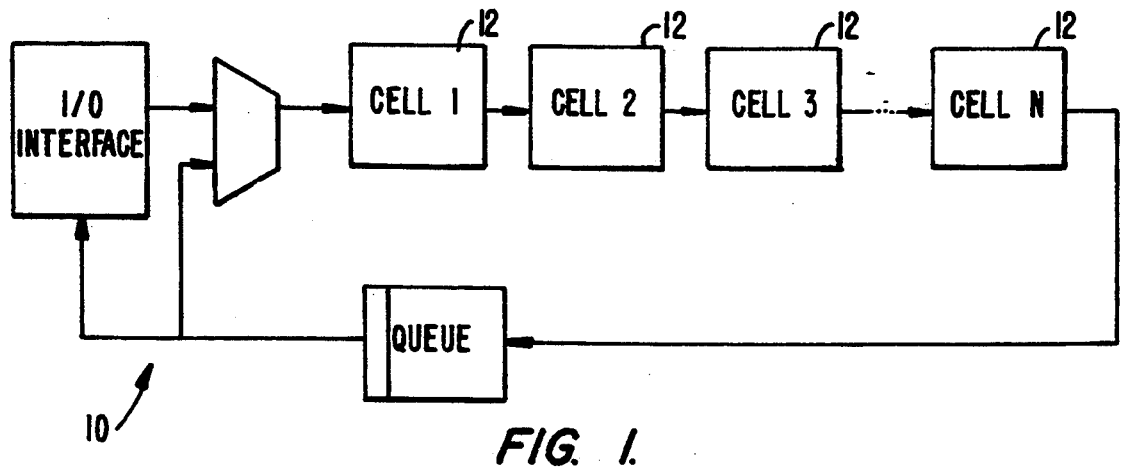
FIG. 1 is a high level block diagram of a first embodiment of the present invention.

FIG. 1 is a high level block diagram of a task flow computing machine 10. Machine 10 comprises a plurality of cells 12 coupled together by an interconnection network. Each cell contains a processing element (e.g., an arithmetic unit) and memory. Data is partitioned across the cells. Computation is performed by a set of tasks flowing through the network and performing operations on the data. Multiple tasks may be active simultaneously, but there is no permanent connection between tasks and processing elements. A single instruction may be executed at each cell, or a task may remain local to a cell while many instructions are executed.

In the embodiment shown in FIG. 1, the interconnection network is a unidirectional ring. Each cell is unidirectionally coupled to one other cell. Other arrangements of cells are possible, such as a bidirectional ring, a chordal ring, a mesh, a torus, a hypercube, or a crossbar. The unidirectional ring is advantageous because it requires no logic for arbitration or routing, and neighboring cells of the ring can be physically adjacent, improving overall cycle time.

Figure 2:
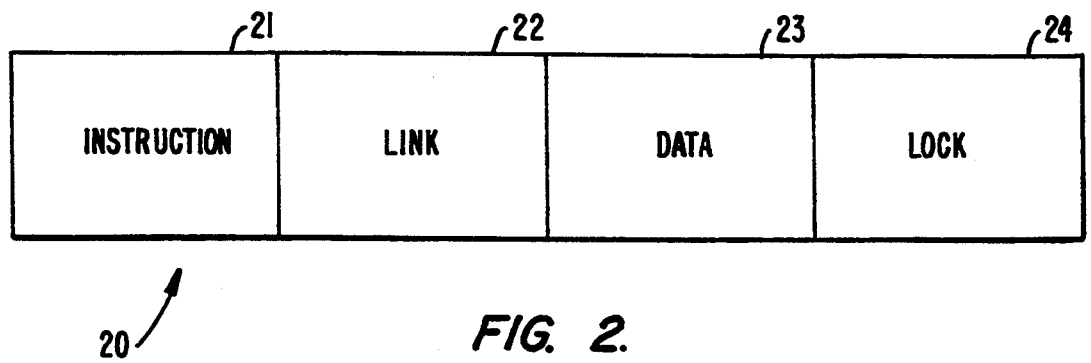
FIG. 2 shows a typical memory packet used in the present invention.

Each cell has a wide shallow memory for storing memory packets. The contents of a memory packet 20 are shown in FIG. 2. A memory packet 20 contains four separate fields for storing an instruction 21, a cell/address link 22 to another memory packet, a data element 23, and a lock bit 24.

The memory packets form a linked list. The cell/address link 22 points to the next cell, and the offset within that cell. A task is executed by following the linked list.

Program execution is accomplished through the flow of transmission packets. Transmission packets are transmitted from one cell to the next, carrying the state of each executing task. Tasks may flow around the ring, or remain local to one cell. Each cell includes bypass logic to allow transmission packets to bypass an intermediate cell between the sending cell and the receiving cell, even if the intermediate cell is busy.

Figure 3:
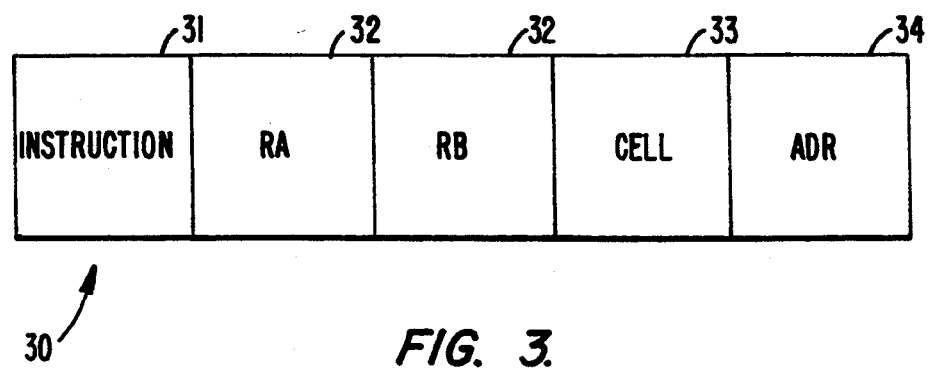
FIG. 3 shows a typical transmission packet used in the present invention.

The contents of a typical transmission packet are shown in FIG. 3. Transmission packet 30 comprises an instruction 31, data registers 32 (two in this embodiment), a destination cell identifier 33, and a memory offset address 34 referencing a memory location at the destination cell.

The cell identifier and memory address together point to a memory packet. The destination cell receives a transmission packet, uses the address embedded in the transmission packet to address a memory packet, performs the operation indicated by the instruction in the transmission packet on data contained in the memory packet, and produces a new transmission packet using the results of the just performed operation. The instruction stored in the addressed memory packet becomes part of the new transmission packet. The new transmission packet is routed to the next memory packet in the linked list, which may be in the same or a different cell.

Figure 4:
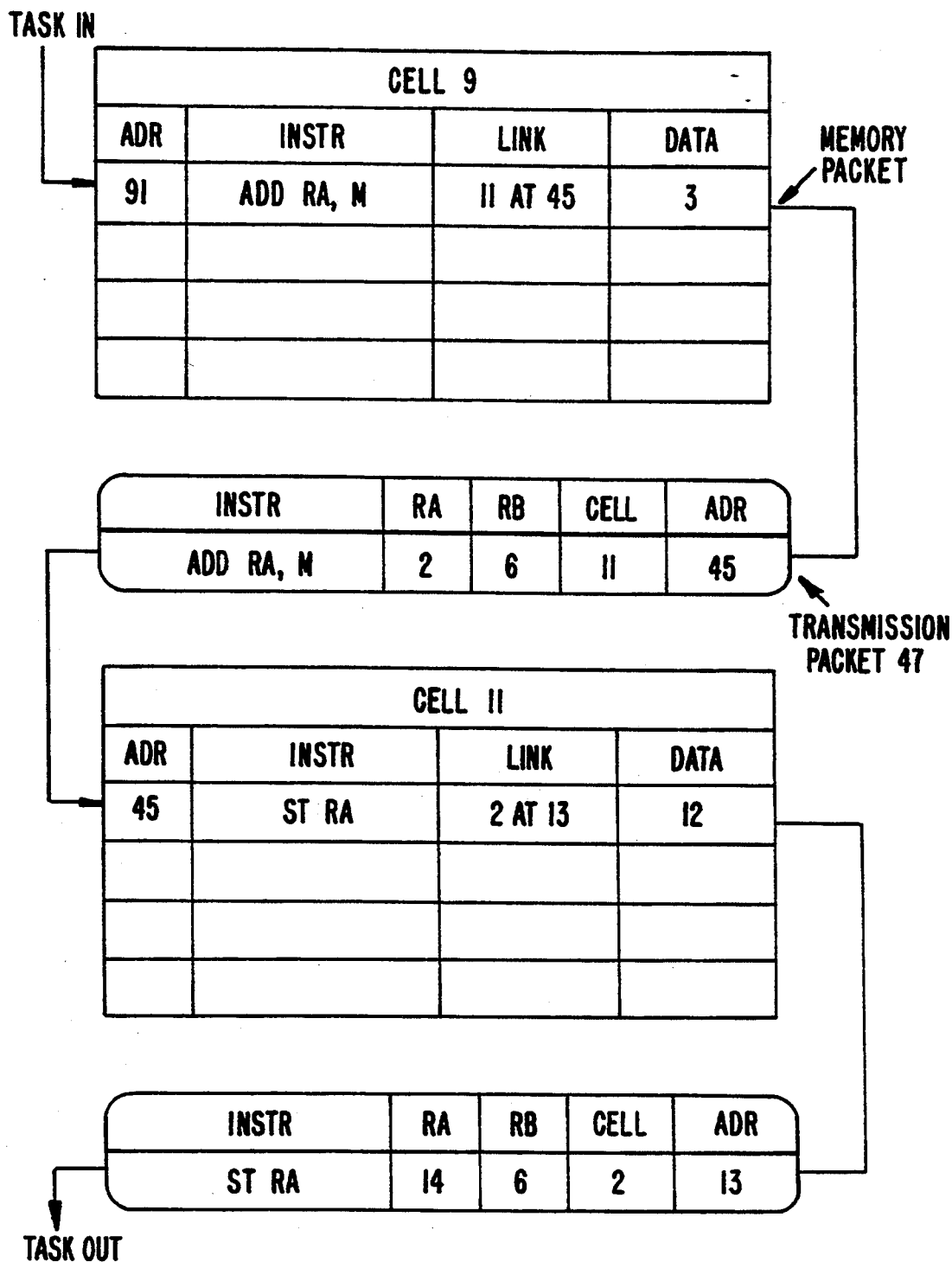
FIG. 4 illustrates how computations are performed by the present invention.

This architecture differs from other parallel computing architectures by sending computations (instructions) to stationary data objects, rather than sending data from memory to stationary processors. A simple example will illustrate the flow of transmission packet. FIG. 4 shows an incoming packet arriving at cell 9, address 91. Address 91 contains an instruction that adds the incoming register field Ra (currently equal to 2) to the data stored in the memory packet to be visited next. A transmission packet 47 is generated in order to send the ADD to cell 11, address 45. When the packet arrives at cell 11, it finds a 12 in the data field, adds it to the register value, then places the sum 14 in the outgoing transmission packet. The outgoing packet also picks up the STORE instruction (ST) and the link to the next memory packet at cell 2, address 13. A more detailed example will be presented later, after the instruction set is described.

Figure 5:
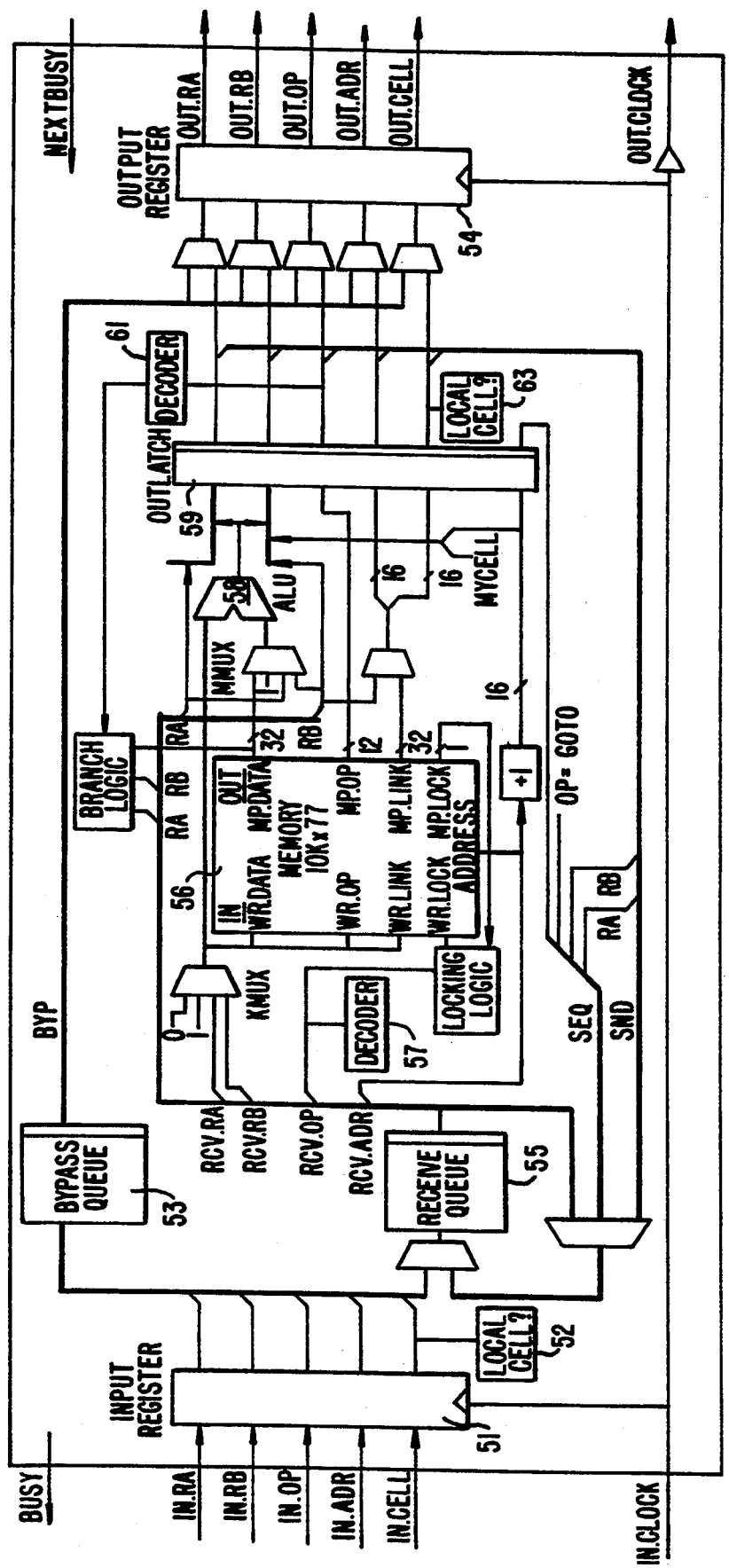
FIG. 5 shows a typical cell used in the present invention.

FIG. 5 is a block diagram showing the construction of a single cell of a computing machine constructed according to this embodiment of the present invention. Input pipeline register 51 receives a transmission packet. Comparator 52 compares the destination cell identifier in the transmission packet to the local cell identifier. If they do not match, the transmission packet is sent through bypass queue 53 to output pipeline register 54. If an instruction is creating a new transmission packet to be sent to another cell, the packet being created has priority for the output register and any bypass packets are queued.

If the received transmission packet cell number matches the local cell number, the transmission packet is passed through receive queue 55 to the execution logic. If the cell is busy, several packets may be queued until the current instruction completes.

Overflow of the queues is prevented by propagating a busy signal to the previous cell in the network when there is just enough room in the cell's queues to store the maximum number of packets which could be generated before the previous cell responds to the busy signal. A busy cell continues to forward packets not intended for it.

The cell cycles through those instructions in its input queue which may be successfully completed. The address field in the transmission packet addresses memory 56 while decoder 57 decodes the instruction field. The data field of the addressed memory packet may be modified by a store instruction or may be used as an operand in a load or arithmetic instruction. Multiplexers select from the memory data, values in received registers, and constants to determine what is sent to Arithmetic Logic Unit (ALU) 58. The lock bit in the memory packet may prevent an instruction from executing. Each instruction which reads or writes the data field has a locking bit which indicates whether the lock bit of the memory packet (see FIG. 2) is to be honored or ignored. If the lock bit is to be honored, instructions which generate data must wait for the lock bit to be cleared before proceeding. Instructions which read data must wait for the lock bit to be set. Tasks which share data use the lock instructions to guarantee that execution will proceed correctly regardless of the order in which instructions arrive. Other locking schemes could be adapted for the task flow machine, including most of the synchronized instructions used in shared memory multiprocessors. The present scheme has the advantage of distributing the synchronization across many different cells.

When an operation is completed, output latch 59 is loaded with the outgoing transmission packet. The outgoing instruction is decoded to determine whether a new task is to be started by a "FORK" instruction. Comparator 63 compares the destination cell identification number to the local cell identification number and, if they are equal, the transmission packet is routed back to receive queue 55. Instructions which fail to complete, either due to a busy signal from the destination cell or due to an inability to access a locked variable, are sent back to receiving queue 55 for later execution or bypass transmission. Transmission packets created by instructions which are just completed are given priority for the output register and any bypass packets are queued.

Instruction fetch is automatically overlapped with data fetch, because the same memory packet stores both the data for one instruction and the opcode for the next instruction. This effectively creates a two stage pipeline which is spread across the two cells visited successively by a given task.

The current embodiment uses physical addresses. The destination cell identifier and next memory packet address are derived by extracting bit fields from the current memory packet link fields. Cell assignments of variables are fixed at compile time. In other embodiments, virtual addressing could be used, allowing relocation of data and paging of memory packets. A virtual-physical address translation table could be placed between the memory link field output as it moves from memory 56 to output latch 59. The translation table could be accessed in parallel with the ALU operation.

Memory requirements for the cell could be reduced by using relative, rather than absolute addressing, to reduce the number of bits required to store the cell number and address offset, or by using variable length memory packets.

Figure 6:
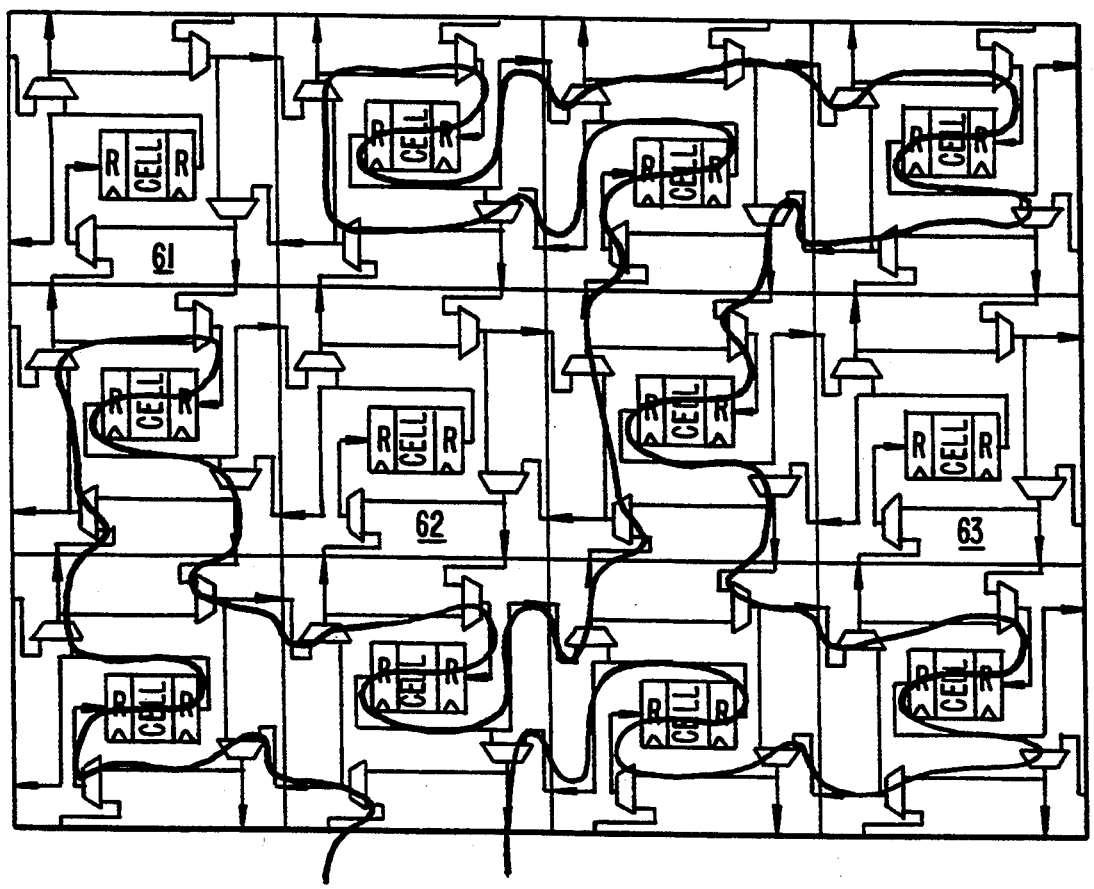
FIG. 6 shows a 3×4 array of cells coupled together by a network of multiplexers.

Although one embodiment of the present invention could comprise a single cell as shown in FIG. 5, another preferred embodiment of the invention uses a plurality of cells, coupled together by a communications network. One possible arrangement of a plurality of cells is shown in FIG. 6, which comprises a 3×4 array of cells on a single wafer. The cells are arranged in a checkerboard pattern with adjacent cells rotated 180°. The delay between pipeline registers in the ring (and thus between the output of one cell and the input of the next cell in the chain) is always the sum of four separate multiplexer delays, and does not depend on the distribution of defective cells. The clock may be propagated through the same multiplexers as the data to reduce clock skew and to tolerate defects in the clock distribution network. The wafer scale integration technique supports fast clock rates due to the fixed delay between cells, the low skew clock distribution scheme, and the lack of run time arbitration and routing decisions that would be required in higher dimension networks.

Each cell border connects to either a neighboring cell or an internal bus through a multiplexer. Defective cells may be avoided through proper setting of multiplexer control latches. In the figure, cells 61, 62 and 63 are defective. The wafer scale integration technique of this embodiment is described in more detail in the article "A Linear-Array WSI Architecture for Improved Yield and Performance", in Proc. International Conference on Wafer Scale Integration, San Francisco, Calif., Jan. 4, 1990, and in copending U.S. patent application Ser. No. 07/346,203, filed May 2, 1989, entitled "Linear Array Wafer Scale Integration Architecture", each of which is hereby incorporated by reference into the present specification in its entirety.

Using 1 micron CMOS technology, the maximum clock frequency for data transfers is approximately 200 MHz or 5 nanoseconds. Instructions require multiple clock cycles, typically ranging from 4 clock cycles for a simple load up to approximately 17 clock cycles for an integer multiply. Instructions which flow to the next cell in the ring incur a 1 clock cycle latency penalty over tasks that remain local. The extra time spent in communications affects the time required for a single task, but does not reduce the peak processing throughput. In many applications, the cells are kept fully utilized by generating multiple tasks per cell.

In this embodiment, half of each cell is devoted to processing and half to memory. Other mixes may prove more appropriate for particular embodiments and applications.

Figure 7:
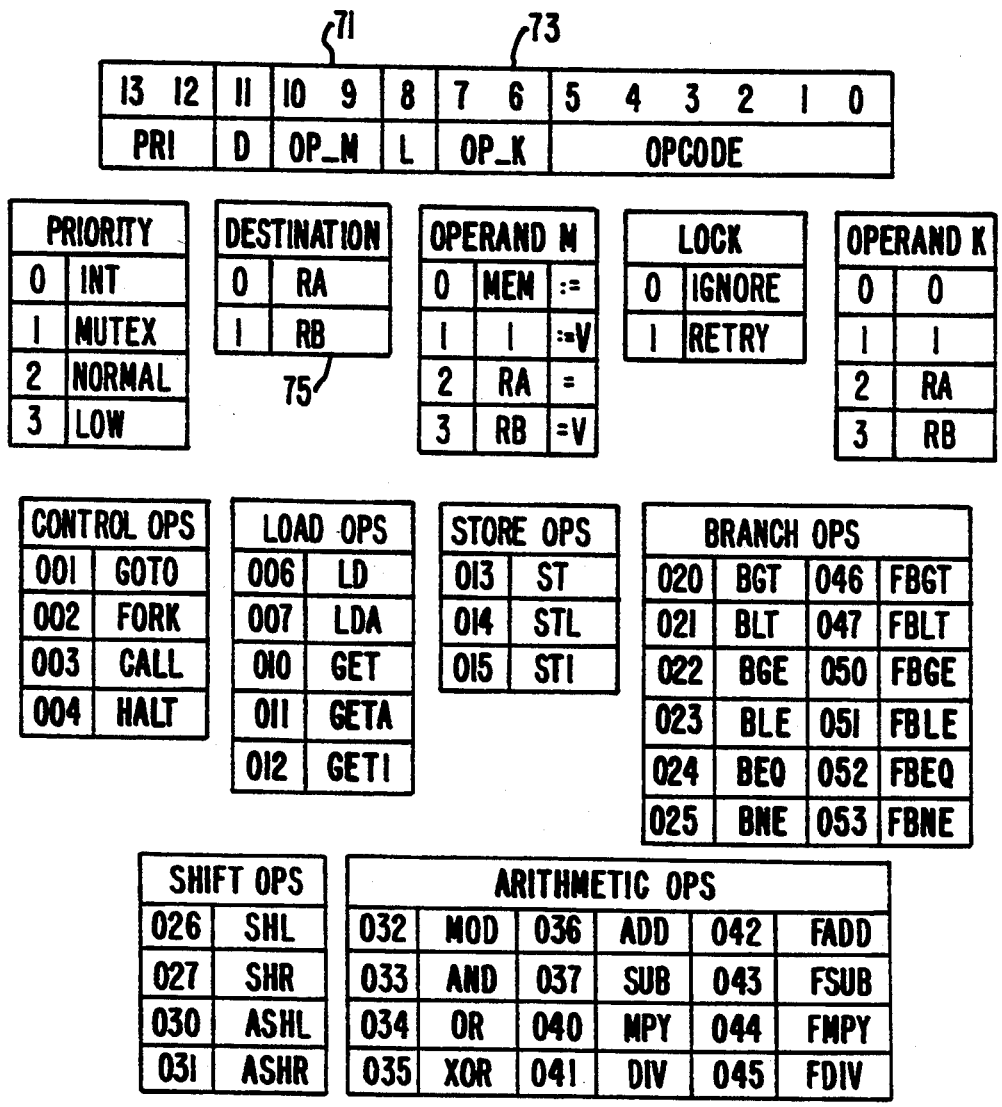
FIG. 7 is a machine level instruction set used by the present invention.

Referring to FIG. 7, a summary of the machine level instruction set of this embodiment is shown. Two operand fields 71 and 73 use data stored in the two registers, the constants 0 or 1, or memory data. In this embodiment, each instruction is limited to one memory reference. Destination field 75 specifies whether the ALU output is directed to Ra or Rb of the outgoing transmission packet.

A summary of the operation of some representative task flow instructions is shown in FIG. 8. For each instruction, the outgoing "SND" transmission packet resulting from execution of the instruction at the receiving cell is shown. In some cases, an "SEQ" transmission packet is created by the sending cell when the instruction is originally fetched.

The "RCV" prefix in several of the instructions refers to a field received in the incoming transmission packet. The "MEM" prefix refers to a field in the local memory packet addressed by the incoming transmission packet.

Arithmetic instructions (ADD, SUB, etc.) have three available operands: the register values Ra and Rb transmitted in the transmission packets sent from the sender to the receiver, and the data in the memory packet fetched at the receiver. For example, ADD instruction 81 adds the memory data value to one of the registers, and stores the result in one of the registers. The resulting transmission packet 83 contains the sum in a register field. The other register field is unmodified. The next instruction and the link address (cell and offset) of the next memory packet have been fetched from the current memory packet and placed in the outgoing transmission packet.

Some instructions "FORK" a task into multiple tasks. When the FORK instruction 85 is fetched from a memory packet, two transmission packets are created. The sending cell dispatches a first packet to the link address and a second (SEQ) packet to the next sequential memory packet in the sending cell. The first transmission packet sends the unchanged registers and the FORK instruction to the receiving cell addressed by the link field of the local memory packet. The FORK instruction is executed as a no-operation at the receiving cell. The second "SEQ" transmission packet sends a NOP instruction to the next sequential memory packet in the same (sending) cell. Some arithmetic operations might combine the FORK with arithmetic operations to provide the destination cell with an operation.

Load and Store instructions allow reading and writing of a data field, link field, or instruction field. Store instructions send a packet to perform the Store operation at the link address. When storing data at a memory location, it is usually not desirable to continue the task that performed the store. Instead, it is desirable to continue the original task at the next sequential memory packet. The Store Via Fork (STF) instruction sends data to the memory packet addressed by the link, but continues the task at the next sequential instruction.

The Store Via Fork (STF) instruction temporarily generates two tasks when it is fetched. A first task sends a first transmission packet to store data to the memory packet addressed by the link and then terminates without generating another transmission packet. A second task sends a SEQ transmission packet to the next sequential memory packet in the same cell. The second task continues at the sending cell, and the data can be accessed at a later state in the execution.

In the instruction set of this embodiment, the termination of the storing task, and the continuation of the sending task, are both optional. The four variations are specified by encoding of the OP_M field (FIG. 7, 71).

The GET instruction (FIG. 8, 87) allows data to be retrieved from a memory packet while ignoring the instruction and link associated with that data. When a GET instruction is fetched, a return address is placed in one of the register fields (Rb) of the transmission packet. The cell that receives the transmission packet fetches the memory data, loads it into a register field, and sends the task to the return location (rather than the target of the link field). The GET instruction always retrieves the data field at the link address; GETA and GETI retrieve the link or instruction field at the link address.

The GET instruction emulates the load instruction of a traditional computer architecture. The address is sent to the data, the data returns, and execution continues at the next location. Without the GET instruction, a separate copy of each memory packet would be required for each unique algorithm accessing the data. The GET instruction allows a memory packet to have more than one possible successor, with the most frequent successor contained in the link field. Algorithms requiring infrequent access to data may use GET, while the most frequent algorithm may use the associated instruction and link fields to avoid the round trip path which would require sending the address and returning the data.

Conditional branch instructions perform a test, and then either a "normal" SND transmission packet is sent to the target of the link field, or a SEQ packet is sent to the next sequential location in the same cell. The BZERO instruction 89 is an example of a conditional branch. As shown in FIG. 7, two sets of Branch Ops allow comparisons of either floating point or fixed point operands selected by operand M and operand K. The six conditions are the conditional tests greater than, less than, greater or equal to, less than or equal to, equal, or not equal. The comparisons may involve register values, memory values, or constants.

The CALL instruction (FIG. 17) is similar to the first part of a GET. The sending instruction places the return address in register Rb. At the destination, CALL performs operations including than fetching of the next memory packet. At the end of the subroutine, a return operation is performed by specifying that Rb should be substituted for the link field. The most significant bit of the link field indicates that Rb is to be used as the link.

The Locked Load (LLOAD) 91 and 93 Locked Store via Fork (LSTF) instructions are examples of instructions which use the lock bit to synchronize tasks.

An example of task flow execution will now be given. FIG. 9 shows an assembly language program for calculating the sum of a multiplication and division for a particular set of values. Specifically, the program calculates:

$$A = B*C + B/D \text{ for } B=6, C=2, D=3$$

FIG. 9 shows the execution of this program, after it is assembled and stored in the cells. Execution begins at cell 1, address 12, where a transmission packet 99 is generated with the Load (LD) instruction and a link address of cell 2, address 23. At cell 2, memory packet 101 is fetched, the load instruction is executed by loading the value "6" from the memory cell into register Rb, and sends a transmission packet 103 with the register value and the Multiply instruction (MPY) to cell 7. At cell 7, the memory packet at address 31 is fetched, and the MPY instruction is executed, multiplying the value in Rb times the memory value from the memory packet and loading the result in register Ra. The instruction in the memory packet is a forked store instruction, STF, so cell 7 generates a SEQ transmission packet 105 to itself, in addition to sending transmission packet 107 to the link address, cell 11, address 45. At cell 11, the STF instruction causes the value in register Ra to be stored in memory location 45, without generating another transmission packet.

At cell 7, the memory packet 106 is fetched from address 32 and transmission packet 109 is sent to cell 9 carrying the Divide (DIV) instruction. At cell 9, the contents of Rb are divided by the memory data element. The result is stored in Ra, in transmission packet 111, along with the ADD instruction. When the transmission packet 111 arrives at cell 11, the data in address 45 has been stored by the STF operation of the parallel task. If the communications network always delivers packets in order, then the store operation will always be completed by the time the main task arrives at cell 11 with the ADD instruction, and it is not necessary to use a locked instruction.

After the ADD instruction is executed at cell 11, transmission packet 113 is sent to cell 2 with a store instruction and the result in register Ra.

It will be understood that the multiplication (B*C) and division (B/C) operation could have been performed by separate, parallel tasks. In that case, B*C would have been stored using the Locked STF (LSTF) instruction, and the addition would have used the Locked Add (LADD) instruction to force the addition to be queued until the store has been completed.

Referring to FIG. 10, another example will illustrate the calculation of the product of a sparse matrix 151 and a vector 152. This calculation is common in neural network simulations and other scientific applications.

This problem can be solved on a three cell, two register task flow machine executing three tasks. Each task first multiplies one of the vector elements by each of the matrix elements in a column, then accumulates the products for one row. FIG. 11 is a simplified flow diagram showing the path traversed by each task when one column of the matrix is assigned to each cell.

An advantage of the machine architecture described herein is that most of the machine consists of fairly simple identical cells. Each cell may be built as a single integrated circuit with wide input and output buses to transmit packets. The preferred embodiment is implemented with wafer scale integration. Linear array wafer scale integration techniques are preferred because such techniques generally offer better "harvest" of good cells on the wafer, and require less configuration hardware then more complex two dimensional topologies. For the unidirectional ring topology of the preferred embodiment, linear array techniques provide high bandwidth communications between neighboring cells at fast clock rates. For large rings, for example more than 100 cells, it may be preferable to use several wafers with a ring network within each wafer and a mesh or crossbar network connecting the wafers.

The wafer scale technique of the preferred embodiment allows linear arrays to be configured from the working cells on a partially good wafer. The technique uses four multiplexers per cell to communicate with the four nearest neighbors. Configuration latches controlling the multiplexers are set in such a way that all working and reachable cells are configured in a linear chain.

Although a preferred embodiment of the present invention has now been described in detail, with reference to FIGS. 1–11, it is understood that additions or modifications may be made to the preferred embodiment without deviating from the teachings of the present invention. Most modifications increase the design complexity of the basic embodiment, but offer improved performance, reduced cost, or specific application support. These design alternatives are briefly outlined in the following section.

Interconnection Networks

The first preferred embodiment of the present invention uses a unidirectional ring, which is adequate for solving several types of problems. However, other applications may benefit from a richer interconnection network which minimizes communications bottlenecks. A drawback to any network more complex than the unidirectional ring is that phase-shifted synchronous clocking would have to be abandoned in favor of global synchronous clocking as when each cell receives data from multiple cells; it is no longer possible to send the clock along with the data. Although it might be possible to use some form of self-timed asynchronous bussing, the short packet lengths in a task flow machine would demand a large penalty for resynchronizing data with the cell's clock. The most practical approach is believed to be synchronous clocking via a carefully designed clock tree to reduce the clock skew. The remaining clock skew may still have some negative impact on performance.

Two-Bus Bidirectional Ring

Figure 12:
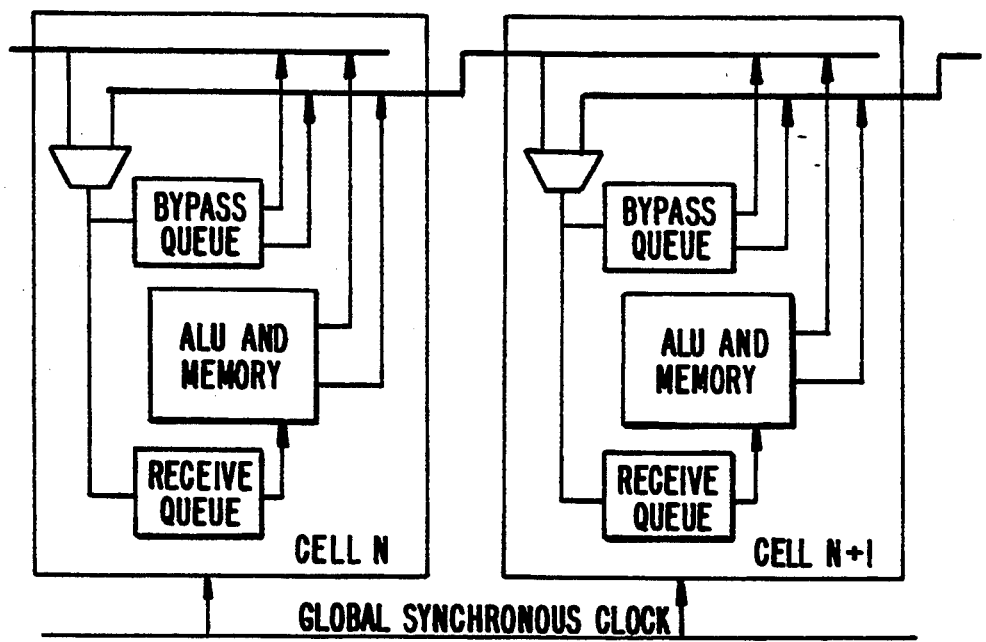

The capability of supporting bidirectional communications may be important for some types of systolic algorithms and for finite-difference solutions to partial differential equations. The simplest approach to bidirectional communications is to allow the intercell busses to carry information in either direction. The number of connections per cell is maintained, but the ring becomes bidirectional. FIG. 12 shows a diagram of two cells in a two-bus-per-cell bidirectional ring.

During each clock cycle, the cell is set to accept a transmission packet from either its left or right neighbor, but not both. The packet may pass through the bypass queue to the outbound bus, or may proceed to the receive queue for processing by the cell. One or more arbitration cycles may be required before each transfer to coordinate access between each pair of cells. Compared with the unidirectional approach, the bidirectional busses are likely to cut total bandwidth by at least half.

Four-Bus Bidirectional Ring

In another embodiment, separate busses are added for each direction of transfer. FIG. 13 shows a bidirectional ring implemented with four bus connections to each cell. Using this structure, the traffic can flow through a cell simultaneously in both directions. The extra busses also allow a more optimistic communications protocol. The sending cell can normally assume there is room in the next cell's bypass or receive queue. A busy signal is sent from each cell to instruct its neighbors to stop sending whenever a queue is about to overflow.

The optimistic protocol should make each bus of the four-bus cell perform approximately the same as busses in the original unidirectional approach. With twice as many busses, bandwidth is approximately doubled. The added performance comes at a cost of twice the number of external connections per cell, additional area for queues, and increased control complexity. However, if there are constraints on the maximum number of I/O lines per cell, adding more busses may require additional multiplexing or weaker I/O buffers, partially offsetting the added bandwidth.

Unidirectional Torus Network

The same cell structure as in FIG. 13 can be used to construct a unidirectional torus network. Four cells of a unidirectional torus are shown in FIG. 14. Each cell participates in one ring in the X-direction and one in the Y-direction.

The torus may be the preferred network for applications requiring higher-dimension routing. It gives three efficient directions for task propagation: internal, X and Y, that may be useful in 3-dimensional matrix calculations.

One drawback of the torus is that it is difficult to imbed in a two dimensional wafer or circuit board while maintaining equal propagation delays between cells.

Other Networks

Many different networks are known for the interconnection of multiprocessor systems, and any of them could be employed in a task flow machine. Some possibilities include the chordal ring, mesh, hypercube, crossbar, and various multistage networks. At each increment of complexity, there is likely to be some loss in performance of a single path due to arbitration, additional multiplexing, and longer distances between communicating cells. In general, complex networks may be less desirable for task flow, because the single path latency time is added directly to the instruction execution time when tasks are flowing through multiple cells. Complex networks may be of more benefit in hybrid communications consisting of local ring or torus networks interconnected at the next level by a richer but slower network.

Reduced Width Interconnections

The width of the transmission packet has a significant influence on the cost of a task flow machine. A major factor in determining the TP width is the number and width of the register fields. Adding one 64-bit register to the architecture requires an additional 128 connections to a cell for the input and output paths (512 connections with the defect-tolerant WSI scheme). It is possible to design an instruction set with a single register and all other operands located in memory, but that design requires many instructions to be defined with multiple memory accesses. Adding a second register helps to simplify the instruction definitions and sequences.

The transmission packets can be sent in several sequential steps. The first packet would include the destination cell, address and instruction, while subsequent packets would hold one register each. This would cut the interconnections significantly, while having a small impact on performance. For instance, 64-bit input and output paths would allow a 16-bit instruction, 16-bit cell number and 32-bit address in the first packet, and 64-bit registers in the next two packets. The performance impact would be small because the destination cell and address are needed first to begin fetching the memory packet. Register values are needed only after the memory packet has been fetched.

With cooperation from the compilers, unused register fields do not need to be transmitted to all. The instruction would include a mask with one extra bit for each instruction to indicate that the instruction value is unused. The compiler or assembler would set this bit whenever it knew that it was safe to ignore the value of the register.

Priority Queue Design

The receive queue should include means for placing retried packets in the waiting state until they have a chance of successfully executing. It is also preferable to have multiple priorities of instructions.

In the simplest design, the receive queue comprises separate queues for each priority level and another queue for waiting packets. Each time an instruction completes, the wait queue is examined to see if any of its packets were bound for the same locations. If so, the earliest of those packets is "promoted" and enqueued in one of the regular priority queues. This is the process used in the first preferred embodiment.

Separate queues may cause inefficient chip area utilization. One queue may be nearly full, while others are mostly empty. Queue utilization is improved if all priorities are stored in a single queue, with registers indicating the boundaries between priority levels. This structure can be implemented by designing the queue as a bidirectional shift register. Each stage of the shift register is wide enough to hold an entire transmission packet, and each stage can be loaded from the left, from the right, or from the input register. When a new packet is to be enqueued, its priority determines where it should be inserted in the queue. A hole is opened for the new packet either by advancing the entries at the head of the queue (if an instruction is currently finishing), or by backing up the entries at the tail of the queue (if no instruction is finishing). A waiting packet is promoted by reading out the packet to be promoted, backing up all entries of lower priority than the promoted one, and rewriting the saved packet after the backed up entries. FIG. 15 shows the receive queue at three sequential time steps, as a new packet is received and a waiting packet is promoted. When a packet is promoted from waiting to active, it is not necessary to advance it in the queue based on its priority. The packet could advance above the other waiting packets and be executed after all other active packets in the queue. Typically, there would be little performance advantage to advancing a newly-promoted packet beyond other active packets, but if the hardware has the capability to insert new packets in priority order, there may be no additional cost.

To determine when to advance a waiting packet, the MP address of the completing packet is compared against the MP address of all waiting TP packets. If an address matches, the waiting TP is promoted to active status. The first preferred embodiment does not consider whether the two instructions are related, or even if both opcodes have the lock bit set.

A TP is a candidate for matching only after it has unsuccessfully attempted to execute a locked instruction at a memory location. The associative matching of MP addresses does not precede every instruction execution; it is done in the background only for instructions in the wait queue which need to be retried. The time to perform the matching and to reorder the queue is overlapped with execution of the next instruction.

A mistake in the advancing of the packet from waiting to active status is acceptable because the worst that can happen is an extra retry of that instruction. To save cost and improve performance, packets whose low-order address bits match the address of the completing instruction are promoted. Another design alternative is to allow a maximum number of waiting instructions.

The implementation of the receive queue offers many design alternatives known to those skilled in the art. The optimal structure depends on the characteristics of the programs to be run and on the design tradeoffs in the chosen technology.

Deadlock Detection

If the entire receive queue fills with waiting packets, no work is accomplished and no more packets are accepted from other cells. Generally, it is not possible to avoid deadlocks because a program can fork an arbitrary number of tasks that are attempting to access locked MPs. The best that can be done is to reduce the probability of deadlocks and to detect their occurrence.

The possibility of deadlock diminishes as the size of the receive queue increases. If the cost of storage is greater in the receive queue than in memory, it may be advantageous to spill the overflow TPs into memory. This can be accomplished by forking a high-priority task to move packets from the queue to memory whenever the number of waiting packets exceeds a preset limit. The logic to promote waiting packets includes knowledge of the addresses of memory-resident packets and a way to selectively return them to the receive queue.

Deadlocks can be detected by periodic polling of the cells. A watchdog timer in each cell generates a signal indicating that the queue has not changed state within a predetermined number of clocks. The timer signal is mapped into the address space as part of an MP containing a conditional branch. These locations are linked to form a ring through all the cells in a manner similar to the code for the rotating critical section. Periodically, the supervisor polls the receive queues by dispatching a task through the linked locations. When the poll task arrives at a cell, it is allowed to execute because the receive queue is never allowed to fill to the point where high-priority tasks are excluded. If the cell is deadlocked, the task is diverted to high-priority code to place its cell number in the outgoing TP before continuing to the next cell. When the task returns to the supervisor, the TP contains an indication of which, if any, cells are deadlocked.

Deadlock recovery may require the selective termination and restart of tasks or the spilling of overflow packets to secondary storage.

Increased Pipelining

The first preferred embodiment is not internally pipelined. An instruction must complete its memory access and ALU operation before the next memory access can begin. More complex implementations could include a pipeline stage between the memory and ALU, or could have pipelined arithmetic units. The added area devoted to pipelining would reduce the total number of cells per wafer, but would allow more than one task to be simultaneously active at each cell.

The primary drawback of supporting multiple active tasks on each cell is the complexity of the control and synchronization logic. For instance, with multiple tasks executing in the same cell, a task cannot assume exclusive access to memory variables, even if that task is running at highest priority. All active tasks in a cell must have the same priority. If only one high priority task is available to run, it must be run by itself with no other active tasks. This type of problem can be solved by careful design. If the added area required for the control of a multi-threaded cell begins to approach the cell area of the simpler design, then it would be preferable to have more simple cells.

Fetching Multiple MPs

In the sparse matrix programs, a large percentage of time is spent in executing the STF instructions to store products for later accumulation. The STF instructions take twice the minimum execution time because each one spawns a second task. One task is sent to perform the store, and the second task contains a GOTO instruction directed at the next sequential location.

A high-performance version of the present invention could eliminate the extra time to fetch and execute the GOTO and halve the time spent in executing STF instructions. The hardware would fetch pairs of MPs instead of fetching them one at a time. Whenever the hardware detects that the first opcode of the pair is STF, it sends the store task plus a task with the opcode and link from the second MP. The GOTO would be completely skipped.

Similarly, when a conditional branch is directed at the MP at address N, if it is determined that the branch will not be taken, the opcode and link from address N+1 would be sent as the outgoing TP. The GOTO to address N+1 is skipped, halving the time for the not-taken path of conditional branches.

By fetching pairs of MPs, other sequential operations may be able to be performed in a single step. In this way, many of the techniques used in superscalar uniprocessors could be applied to task flow processors. The total speedup may not be as great, however, because flowing tasks can not take advantage of multiple fetches when the sequential TPs are in different cells.

Memory Compression

The first embodiment of the present invention makes no attempt to minimize the memory required to store the memory packets. Every MP includes the instruction plus a full width absolute link field and a full width data field, even when these fields are unused. Variable length MPs can reduce memory requirements by allowing for variable length fields. One possible encoding of variable length MPs is shown in FIG. 16.

The memory is partitioned into 17-bit data words, with each data word holding a 16-bit portion of an instruction, link or data field, and a bit to indicate the end of the packet. One bit of each link field signals the end of the link. Link fields may consist of single-word relative addresses that point to nearby MPs in the same or nearby cells, or multiple-word absolute addresses. Variable length data fields allow for multiple operand types while requiring the minimum amount of memory.

Memory packet compression can significantly reduce the memory requirements for a task flow program, but has some impact on performance. If the memory fetches four words (68 bits) per access, the beginning of each packet may fall within any of the four words. Multiple fetches may be required even when the packet size is less than or equal to four words. The problem is analogous to instruction and data alignment problems encountered in traditional architectures in which operands or instructions are not always the same width as the memory. Performance loss can be minimized if the compiler or assembler attempts to place memory packets at the beginning of four-word boundaries. When this is not possible, the hardware must automatically perform the multiple fetches.

Memory Hierarchies

The first embodiment of the present invention assumes a flat memory hierarchy. In effect, each cell's memory is used in place of the memory, cache, and large register files of other machines. The flat hierarchy greatly simplifies synchronization and data coherence, since there is only one copy of each data item. But the flat hierarchy forces the whole memory to be designed with static RAM cells.

Other levels of memory hierarchy could be added within the cell. A small static-RAM cache could be fed from a larger dynamic-RAM memory. This may allow larger memories in the same amount of silicon area, but at some performance impact. On traditional machines, caches improve memory access times because the same memory location is frequently reused (temporal locality) and because an access to one location frequently signals a future access to other nearby locations (spatial locality). In task flow machines, temporal locality still applies, but the nearby locations may be in neighboring cells instead of neighboring locations in the same cell. Caches still may be beneficial due to reuse of the same memory data, but performance improvement from caching would be less than for traditional machines.

Additional memory could be added external to the cells to give a structure similar to the extended main storage of some mainframes. The memory packets would be downloaded to the cells in large blocks (pages) rather than as individual cache faults. Extended storage may allow larger problems to be solved without off-wafer connections. Two cell types could be intermixed: one with static storage and an execution unit, and another with dynamic storage and a direct-memory-access engine. Some additional memory compression may be useful when transferring from static to dynamic storage.

Virtual Memory

In the first preferred embodiment, the destination cell and address are derived by extracting bitfields from the MP link field. This "physical addressing" requires cell assignments of variables to be fixed at compile time. Virtual addressing could be added by placing a virtual-physical address translation table between the memory link field and the output latch. The translation memory would be accessed in parallel with the ALU operation. Virtual addressing would allow relocation of data and would permit the paging of memory packets to bulk RAM or disk storage.

High-Performance I/O

The first preferred embodiment incorporates a simple memory-mapped I/O system. A portion of the address space of cell 0 is reserved for writing results to output devices and reading data from input devices. Output is performed by sending a store instruction to one of the output locations, and input is performed by sending a GET to one of the input locations. The same basic structure could be expanded and used either to control several I/O devices, or to communicate with a host processor. Transfers from an I/O buffer to a cell involve forming a TP by appending the incoming data with the destination address and ST opcode. The I/O packets are then injected into the ring.

With the current structure, cell 0 can accept or generate a packet once every clock cycle. If packets arrive at the maximum rate of 200 MHZ, and each packet carries 32-bits of data, the peak I/O bandwidth is 800 Mbytes/s. At this rate, the limit to I/O performance will generally be determined by the I/O busses and devices, not by the bandwidth limits in the ring network.

Additional I/O nodes can be spread throughout the ring if additional I/O bandwidth is required or if it is more convenient to have multiple independent I/O controller cells. Systems comprising multiple wafers may interface through one or more I/O cells per wafer, or a set of I/O cells may be connected to the processing cells through a crossbar or other network. In database applications, it may even be advantageous to have one or more discs per cell. In that case every cell would have a portion of address space reserved for memory-mapped I/O.

Non-WSI Implementations

While a wafer-scale implementation has been disclosed, it is also possible to design a task flow machine with more traditional packaging technology. Since most of the machine consists of simple identical cells, a system could be designed with one cell per integrated circuit. The main consideration in this approach is the number of interconnection pins required. In the first embodiment, each transmission packet includes two registers (32 or 64 bits each), the link to the next MP (32 bits), the instruction (14 bits), and a few control bits (clock, busy, parity, etc.). Thus, each TP is approximately 114–178 bits. Doubling this for input and output busses totals 228–396 signal pins, assuming no multiplexing. Packages with 228 pins are within the feasible range of current packaging technology, but packages with 396 signal pins (plus the many ground and power pins required) are beyond the capabilities of most vendors. It is more likely that the pin reduction techniques described earlier would be used to send the TPs in stages over 64-bit busses. This reduces signal pins to the 130–140 pin range, and allows the use of pin-grid-array packages, surface mount packages, or multi-chip carriers.

The performance of a cell-per-chip design would suffer compared to a WSI design, due to the added cycles for signal multiplexing and the increased cycle time. Unlike the WSI design, each cell must have off-chip buffers that can drive the capacitance of a printed circuit board. The maximum cycle time of register to register transfers across chip boundaries is likely to exceed the 5 nanoseconds used in the first embodiment.

The above description of several embodiments of the invention will be sufficient for those skilled in the art to practice the invention. Additional examples, advantages, and experimental results will be found in the following publication: *Task Flow, A Novel Approach To Fine Grain Wafer Scale Parallel Computing*, Report CRHC-91-15, Center for Reliable and High Performance Computing at Coordinated Science Lab, University of Illinois at Urbana Champaign, published April 1991, which publication is hereby incorporated by reference in its entirety into this specification.

Given the range of modifications just described, applicant's invention should not be construed in connection with any one embodiment, but rather defined by the broad scope and breadth of the claim recitation to follow.

What is claimed is:

1. A computer comprising:
   a plurality of cells coupled in a communications network, each of said cells comprising:
   a memory for storing instructions in a plurality of memory packets, wherein each of said memory packets is associated with a linked list, said linked list specifying an order of instruction execution;
   transmission packet generating means coupled to said memory for generating an outgoing transmission packet containing a first instruction, a first register value, and a first link field for storing a destination cell specifier and a destination memory packet address;
   output means coupled to said transmission packet generating means for transmitting the outgoing transmission packet to a cell identified by said destination cell specifier in the outgoing transmission packet;
   input means coupled to said memory for receiving a plurality of incoming transmission packets, one of said plurality of incoming transmission packets containing a second instruction, a second register value, and a second link field for storing a target memory packet address; and
   processing means coupled to said memory, input means and generating means for processing the one of said plurality of incoming transmission packets by executing the second instruction using a data element contained in one of said plurality of memory packets identified by said target memory packet address as an operand;
   wherein the first instruction is retrieved from the one of said plurality of memory packets identified by said target memory packet address.

2. The computer of claim 1 wherein the first link field contains a link address retrieved from the one of said plurality of memory packets identified by said target memory packet address.

3. The computer of claim 1 wherein said transmission packet generating means further comprises means responsive to the first instruction for loading a return address into the first register value in the outgoing transmission packet.

4. The computer of claim 1 wherein said transmission packet generating means further comprises means responsive to the second instruction for loading the first link field with the second register value so that the outgoing transmission packet is directed to a return address.

5. The computer of claim 1 wherein the communication network is a unidirectional ring.

6. The computer of claim 1 wherein the processing means comprises an arithmetic logic unit.

7. The computer of claim 1 wherein each of said memory packets is variable length.

8. The computer of claim 1 wherein each of said memory packets is fixed length.

9. The computer of claim 1 wherein said plurality of cells are fabricated on a single wafer.

10. The computer of claim 1 wherein each of said cells is on a separate integrated circuit chip.

11. The computer of claim 2 wherein said transmission packet generating means further comprises means responsive to the first instruction for generating a second outgoing transmission packet containing a third instruction, a third register value, and a third link field.

12. The computer of claim 11 wherein the third link field contains an instruction-generated memory packet address that sequentially and immediately follows said target memory packet address in said memory.

13. A computer comprising:
a plurality of cells coupled in a communications network, each of said cells comprising:
a memory for storing instructions in a plurality of memory packets, wherein each of said memory packets is associated with a linked list, said linked list specifying an order of instruction execution;
transmission packet generating means coupled to said memory for generating an outgoing transmission packet containing a first instruction, a first register value, and a first link field for storing a destination cell specifier and a destination memory packet address;
output means coupled to said transmission packet generating means for transmitting the outgoing transmission packet to a cell identified by said destination cell specifier in the outgoing transmission packet;
input means coupled to said memory for receiving a plurality of incoming transmission packets, one of said plurality of incoming transmission packets containing a second instruction, a second register value, and a second link field for storing a target memory packet address; and
processing means coupled to said memory, input means and generating means for processing the one of said plurality of incoming transmission packets by executing the second instruction using a data element contained in one of said plurality of memory packets identified by said target memory packet address as an operand;
said processing means further comprises means responsive to the second instruction for determining existence of a condition by comparing the data element in the one of said plurality of memory packets identified by said target memory packet address with a compare value and
loading the first link field with an instruction-generated memory packet address that sequentially and immediately follows said target memory packet address in said memory when the condition is absent; and
loading the first link field with a link address stored in the one of said plurality of memory packets identified by said target memory packet address when the condition exists.

14. The computer of claim 13 wherein said compare value is a quantity selected from a group consisting of the second register value and a constant.

15. In a computer comprising a plurality of cells coupled through a communication network, each of said cells having a processor for executing instructions and a memory coupled to the processor, a method of executing a task defined by a computer program comprising the steps of:
creating a linked list from a plurality of memory packets by storing a link address in each memory packet of the plurality of memory packets, the linked list specifying an order of instruction execution;
fixing cell assignments of the plurality of memory packets when the computer program is compiled such that each of the memory packets is selectively disposed in a particular cell of the plurality of cells;
transmitting a first transmission packet to a first cell of the plurality of cells, the first transmission packet containing a first instruction and a first pointer, the first pointer including a first destination cell identifier and a first memory packet address that identify a first memory packet of the plurality of memory packets stored in the first cell;
accessing the first memory packet in the first cell using the first memory packet address;
executing the first instruction on the processor in the first cell;
generating a second transmission packet containing a second instruction and a second pointer; and
repeating the transmitting, accessing, executing, and generating steps for the second transmission packet.

16. The method of claim 15 wherein said generating step further comprises the step of, in response to the second instruction, generating a third transmission packet containing a third pointer to a second memory packet of the plurality of memory packets having a second memory packet address in the first cell that sequentially and immediately follows the first memory packet address.

17. The method of claim 15 wherein said executing step uses a data element of the first memory packet as an operand.

18. The method of claim 17 wherein the second instruction and the second pointer are retrieved from the first memory packet, and wherein the second pointer identifies a second memory packet of the plurality of memory packets and through the second pointer forms a portion of said linked list.

19. The method of claim 15 wherein the first transmission packet further comprises a first register value.

20. The method of claim 19 wherein said executing step results in storing the first register value as a data element in the first memory packet.

21. The method of claim 19 wherein said executing step results in storing the first register value as a third pointer in the first memory packet.

22. The method of claim 19 wherein the second transmission packet further comprises a second register value.

23. The method of claim 22 wherein said generating step further comprises the step of, in response to the second instruction, loading a return address as the second register value.

24. The method of claim 19 wherein said generating step further comprises the step of, in response to the first instruction, loading the first register value as the second pointer in the second transmission packet.

25. The method of claim 19 wherein said executing step further comprises the step of, in response to the first instruction, determining existence of a condition by comparing a first value and a second value and
loading the first destination cell identifier and a second memory packet address that sequentially and immediately follows the first memory packet address as the second pointer when the condition is absent; and
loading a third pointer stored in the first memory packet as the second pointer when the condition is present.

26. The method of claim 25 wherein said first value and second value are quantities selected from a group consisting of:
a constant, the first register value in the first transmission packet, and a data element in the first memory packet.

27. In a computer containing a plurality of cells serially disposed in a communication network, each of the cells having a processor for executing instructions and a memory, a method of executing a task comprising the steps of:

assigning a plurality of instructions requiring sequential execution to a plurality of memory packets;

creating a linked list from the plurality of memory packets based upon a plurality of pointers held by the plurality of memory packets, one pointer of the plurality of pointers being held by each memory packet of the plurality of memory packets, the linked list defining instruction execution sequence;

storing the plurality of memory packets comprising the linked list in the plurality of cells, each cell of the plurality of cells being selectively chosen based on location within the communication network to hold a particular memory packet of the plurality of memory packets to facilitate sequential execution of the plurality of instructions;

fetching a first instruction of the plurality of instructions and a first address from a first memory packet of the plurality of memory packets stored in a first cell of the plurality of cells;

sending the first instruction and first address from the first cell to a second cell of the plurality of cells in a first transmission packet via the communication network;

decoding the first instruction at the second cell while addressing a second memory packet of the plurality of memory packets that is sequentially next in the linked list using the first address, the second memory packet containing a second instruction of the plurality of instructions;

executing the first instruction at the second cell;

sending the second instruction from the second cell to a third cell of the plurality of cells via the communication network; and decoding and executing the second instruction at the third cell.

28. The method of claim 27 further comprising the step of decoding the second instruction at the second cell to determine whether a new task is to be started.

29. The method of claim 28 wherein said step of executing the first instruction further comprises the use of a data element contained in the second memory packet as an operand.

30. The method of claim 29 further comprising the step of simultaneously fetching the second instruction while fetching the data element.

31. The method of claim 27 further comprising the step of:

assigning a priority level to each of the instructions of the plurality of instructions, the priority level dictating order of instruction execution when two or more of the plurality of instructions are awaiting execution in a single cell of said plurality of cells.

32. A computer comprising:

a plurality of cells coupled in a communications network, each of said cells comprising:

a memory for storing instructions in a plurality of memory packets, wherein each of said memory packets is associated with a linked list, said linked list specifying an order of instruction execution;

transmission packet generating means coupled to said memory for generating an outgoing transmission packet containing a first instruction, a first register value, and a first link field for storing a destination cell specifier and a destination memory packet address;

output means coupled to said transmission packet generating means for transmitting the outgoing transmission packet to a cell identified by said destination cell specifier in the outgoing transmission packet;

input means coupled to said memory for receiving a plurality of incoming transmission packets, one of said plurality of incoming transmission packets containing a second instruction, a second register value, and a second link field for storing a target memory packet address;

said plurality of incoming transmission packets includes affected incoming transmission packets and unaffected incoming transmission packets, and each of said memory packets contains a lock bit which will force said affected incoming transmission packets to wait an unspecified period of time before being processed;

processing means coupled to said memory, input means and generating means for processing the one of said plurality of incoming transmission packets by executing the second instruction using a data element contained in one of said plurality of memory packets identified by said target memory packet address as an operand; and a receive queue coupled to said input means, said receive queue containing said unaffected and affected incoming transmission packets, each of said unaffected incoming transmission packets having a priority level and being queued in accordance with the priority level such that priority level hierarchy dictates order of incoming transmission packet processing, each of said affected incoming transmission packets being held in a wait state.

33. The computer of claim 32 wherein said receive queue comprises a first queue for said affected incoming transmission packets, a second queue for said unaffected incoming transmission packets having a first priority level, and a third queue for unaffected incoming transmission packets having a second priority level.

34. The computer of claim 32 wherein said receive queue comprises a single queue.

35. The computer of claim 34 wherein said receive queue comprises a bidirectional shift register.

* * * * *